United States Patent [19]

Robinson et al.

[11] Patent Number: 5,543,196
[45] Date of Patent: Aug. 6, 1996

[54] SELVEDGE REINFORCEMENT

[76] Inventors: Michael D. Robinson, 63 Waimaukau Station Rd., Waimaukau, Auckland, New Zealand; Barry J. Causton, 2180 Brickell Ave., Miami, Fla. 33129

[21] Appl. No.: 279,882

[22] Filed: Jul. 26, 1994

[51] Int. Cl.[6] .................................................. B32B 3/06
[52] U.S. Cl. ..................... 428/99; 160/330; 160/340; 160/387; 160/390; 160/DIG. 6; 428/102; 428/121; 428/124; 428/131; 428/192
[58] Field of Search ................................ 428/99, 98, 102, 428/121, 124, 131, 192; 160/330, 340, 387, 390, DIG. 6

[56] References Cited

U.S. PATENT DOCUMENTS

| | | | |
|---|---|---|---|
| 1,672,640 | 6/1928 | Doederlein | 428/99 |
| 1,871,571 | 8/1932 | Weber | 428/99 |
| 3,590,864 | 7/1971 | Vechesloff | 428/99 |
| 3,661,693 | 5/1972 | Pierson | 428/99 |
| 4,913,942 | 4/1990 | Jick | 428/99 |

*Primary Examiner*—Nasser Ahmad
*Attorney, Agent, or Firm*—Young & Thompson

[57] ABSTRACT

There is supported, from support cables under tension, a porous textile product suitable for use in shielding farm plants or animals from adverse weather. A hem cable of a pliable multifilament wire inside a soft sheath is sewn around one or more edges of a panel of a preferred cloth, with its free ends exteriorised at one corner. Frangible plastic clips are used to make loops around both the hem cable and the support cables. Optional panel stretching uses a hem cable anchor holding the cables to a fixed support located by one corner of the panel, a pulley at each adjacent corner, and a hem cable tensioner located at the free ends may be used to maintain the panel in a spread-out state. Alternative ways to provide a fabric panel with edge reinforcements are described.

4 Claims, 2 Drawing Sheets

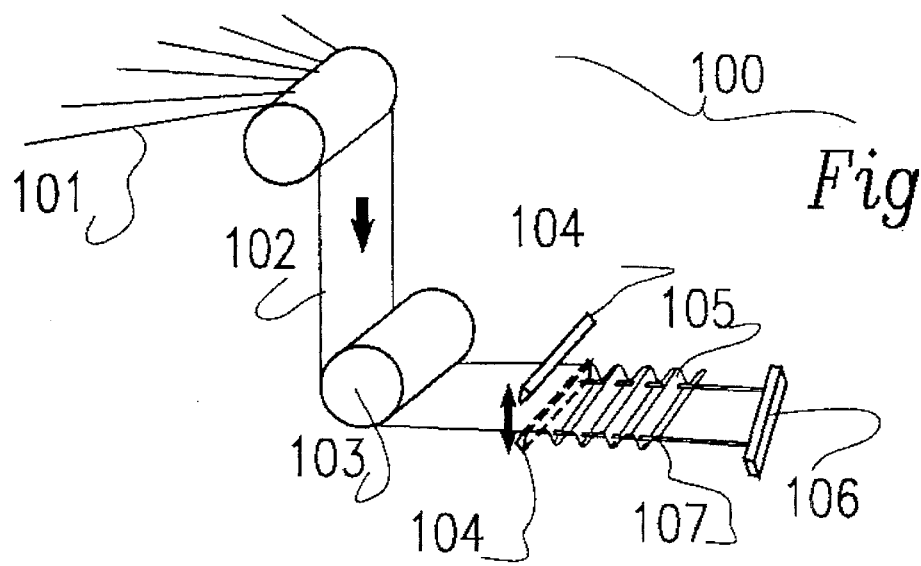
Fig 1
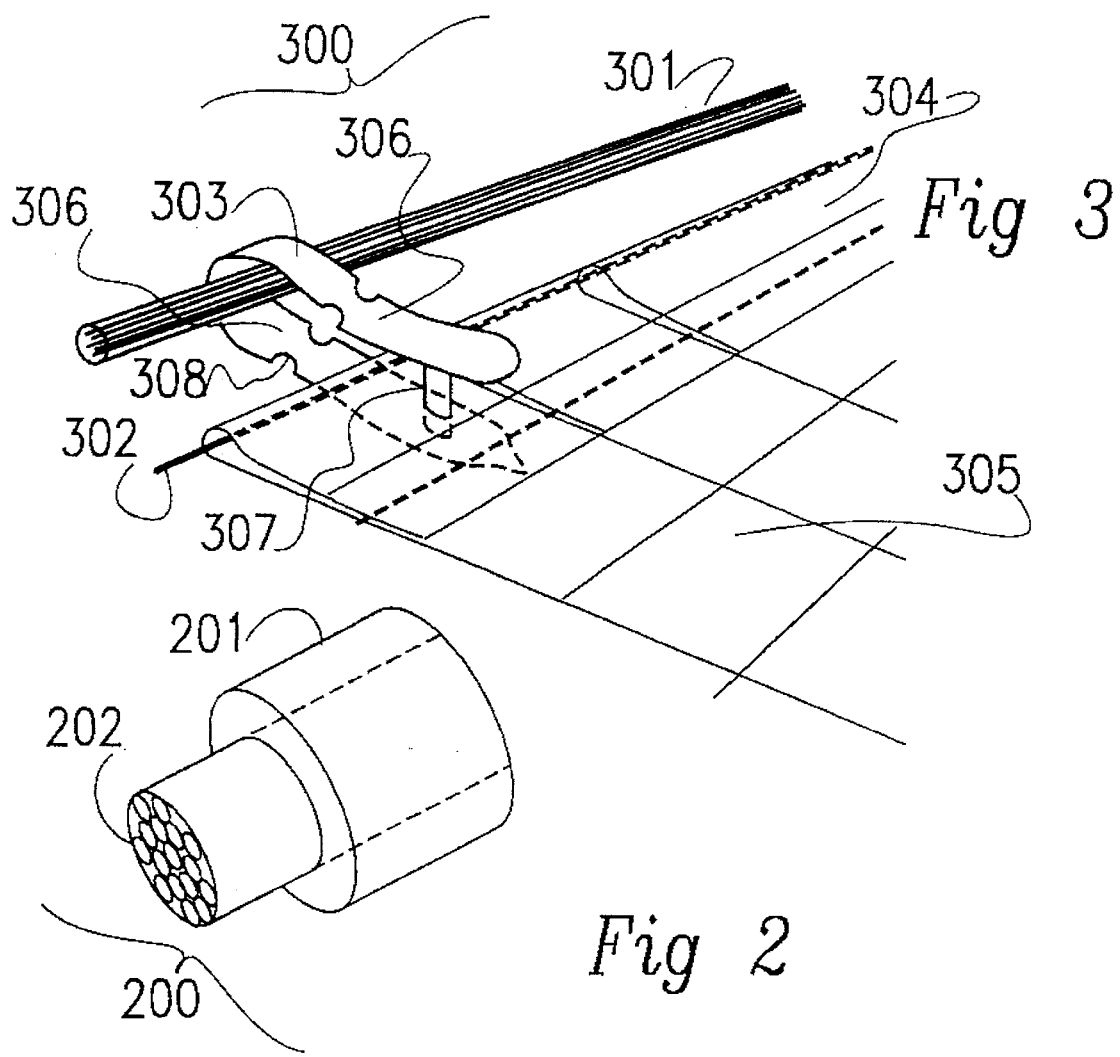
Fig 3
Fig 2

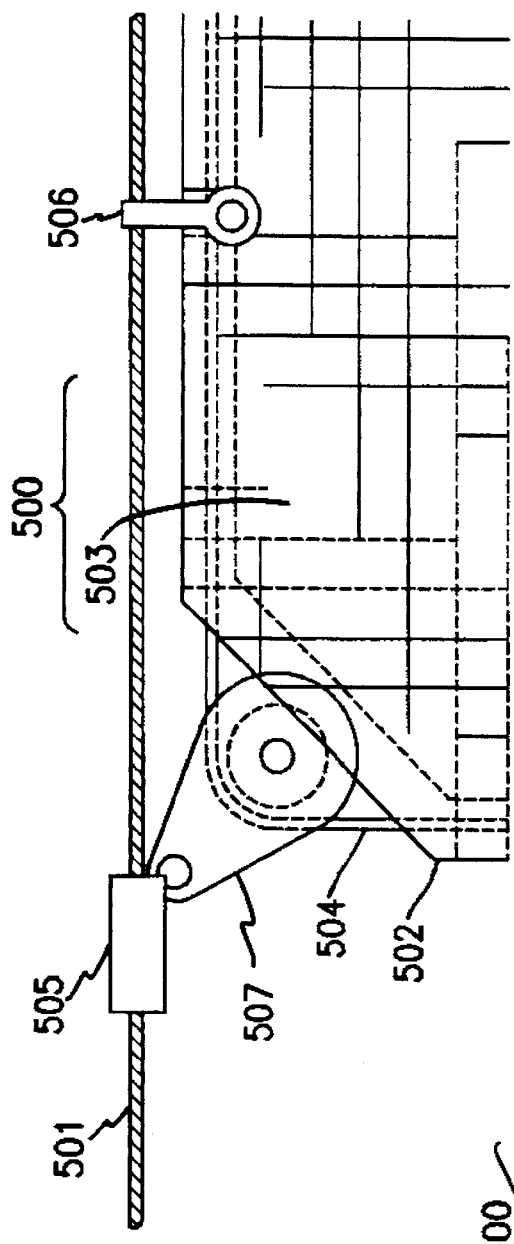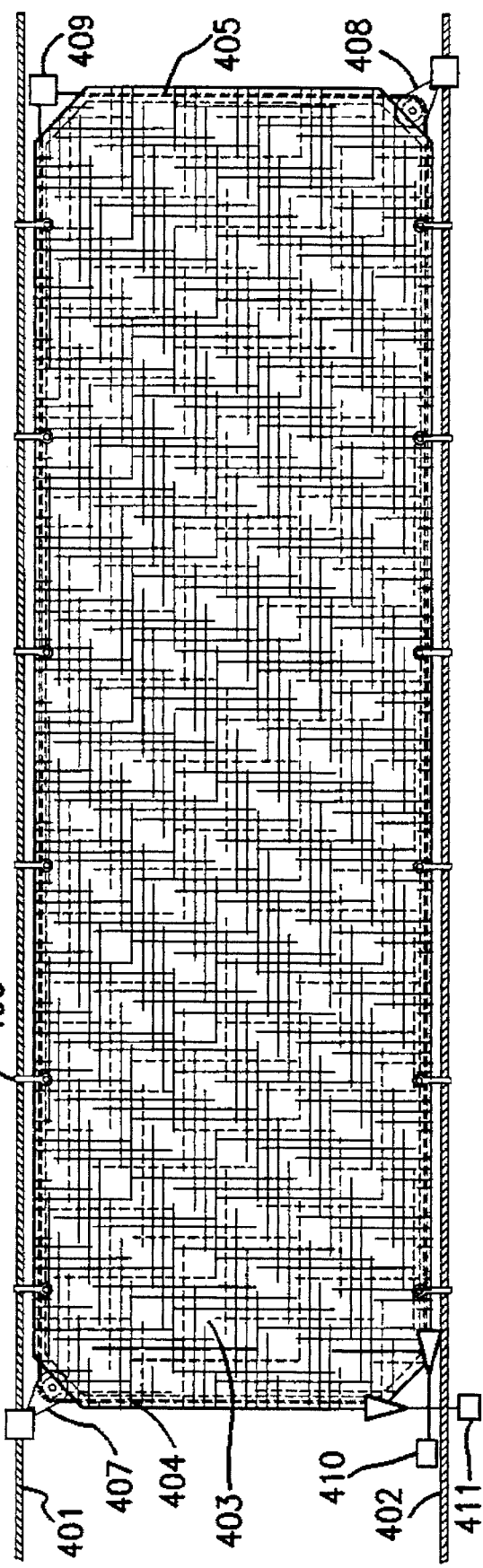

SELVEDGE REINFORCEMENT

FIELD OF THE INVENTION

This invention relates to the field of agricultural crop shielding or protection, and in particular to improvements in fabrics and fabric attachment means for the purpose.

BACKGROUND

The use of porous or open-weave cloths, textiles or fabrics to shield plants or animals from adverse environmental conditions has been known for some time. Adequate shielding can actually be provided in many cases by an only partial blocking of the effect—which may for example be wind, sun, or rain—by an open-weave fabric usually made by knitting or weaving (for example) of smut fibres of a plastics material such as a nylon or polypropylene. The plastics material is treated with additives to reduce environmental degradation. Usually the fabric is made and used in the form of a long strip, typically one, two, or preferably three meters wide and perhaps 500 meters long, although this can be cut to any length. The plastics fibres of these fabrics (typically polyethylene, polypropylene or polyester yarns) are inherently flexible, stretchy, and liable to abrade. They have some tensile strength but it is not sufficient to support long spans of their own weight over a span, and over a long period, even in the absence of any extra stresses due to wind loading or the weight of trapped snow or hail. For this reason it is customary to sling cables capable of carrying tensile force over gaps above the area to be protected and attach the edges of the shielding fabrics to those cables. These cables may be made of high-tensile steel, for example, and they may be surface-treated against corrosion.

The preferred plastic fabrics also have minimal shear strength in the plane of the fabric which results in minimal transfer of load between the tensed steel cables running parallel to the fabric selvedges, particularly between attachment points and adjacent yarns not directly attached. Therefore it is important to be able to hold the strips of fabrics in a way that transfers the load to the maximum number of yarns from each attachment point in order to successfully build a durable, reliable and economical structure using these fabrics. At the same time, the system must be easy to install in the field.

AGRICULTURAL STRUCTURES

Preferred arrangements for the spatial positioning and support of the cables for various configurations of agricultural shelter are as follows:

Canopy Structures

The supporting structure perhaps 20 years ago was usually a timber frame which the fabrics were battened to with timber battens. Although this structure is still used, it is generally recognised as too expensive, and often, as too weak to withstand wind, snow, ice and hail loads.

The preferred support structure is now more usually constructed from a grid of parallel cables supporting the selvedge of fabric panels, crossed at approximately 90 degrees with a second set of generally parallel cables to fix the spacing of the first set and to (optionally) reduce the deflections of the fabric under load perpendicular to the plane of the fabric. A third set parallel to the first set may also be used as a mid-span support for the fabric panels. The cable grid is supported vertically by generally upright poles fixed to either or both sets of cables. At their ends (and also at intermediate points for extensive structures) the cables are fixed to an anchor assembly usually comprising a pole (or poles) and a tie to a ground anchor.

Fence Structures

The support structure may be a line or lines of cantilevered poles with wires or cables between; or two or more near right-angled grids of cables vertically spaced with poles at some or all of the grid node points providing vertical support and maintaining the vertical separation between the grids. In each case the fabric is attached to some or all of the cables or wires, and to some or all of the poles.

Existing porous fabric attachment technology.

The object is to collect the tension in the fabric into the reinforced selvedge over a distance and transfer it to the parallel support cable. The distance depends on the structural efficiency of the reinforcing, and the structural characteristics of the transfer clip. A number of selvedge reinforcing systems exist, such as:

Eyelets and Wire

Steel wires threaded in and out eyelets provided in the fabric have been used in Australia and New Zealand. This has provided sufficient strength, but has had problems. viz. Fabric slipping down the wire leading to bunching at one end of the structure after a storm; and sandy or salty environments causing degradation of the wire in turn leading to early abrasion failure of the fabric.

Sewn Hems and Wire

Fabric has been hemmed on-site onto steel wires. Problems with sewing variability has led to this system being largely discontinued. Instead hems are sewn in a factory, and rope drawcords provided to allow a wire to be pulled into the hem as the rope is pulled out.

Tape and Grommet

In this system the cloth selvedge is reinforced by sewing on a strip or strips of webbing. Grommets are then punched into the reinforced area at intervals of typically 150 mm to 600 mm depending on the expected load.

Tape Tension-Bands

The tape in the tape and grommet system is sewn along the selvedge and thus parallel to the edge of the cloth. An alternative is to sew the tape in a catenary shape spanning perhaps 10 m and running from the selvedge to a point approximately 1 m in from the selvedge, then back to the selvedge. The tape is then firmly anchored every 10 m and the selvedge only lightly anchored along its length.

A number of methods for connecting the reinforced selvedge to the parallel support cable exist, such as:

"S" Hooks

These are most commonly used with the tape and grommet system. They are relatively rigid, and have a tendency to fall out on the down-wind side of the fabric.

Snap Fit "D" Shackles

These shackles are made from a variety of plastic type materials, but most commonly a nylon such as Nylon 11 or Nylon 6. They were originally developed for use as running shackles for light-weight yachting ropes.

"Butterfly" Clamps

These are designed to clamp a small section of selvedge (normally unreinforced).

The existing technology has a number of shortcomings, some of which have been revealed by analysis of failures. In the process of investigating failed porous fabric structures in New Zealand, Australia and the Pacific Islands, and particularly after Hurricane Andrew in Florida, it has been observed that:

1. The fabric has a tendency to slide along the hem cable if one is used.
2. Fabric left on structures in extreme winds can cause the entire structure to be destroyed, thus dramatically extending the time until a replacement can be erected and production of the crop protected by the structure resumed.

3. The gusty nature of winds create high impact loads which can lead to premature failure of the more rigid systems. Fatigue failure may also be a factor in such situations.

4. Tape and grommet systems, and butterfly clamps do not adequately transfer the load between the fabric and the support cable in that they fall at a small fraction of the intrinsic strength of the fabric.

5. Tape tension-band systems are too flexible leading to flapping cloth and an increase in impact loads and cloth abrasion/fatigue problems.

In addition, when constructing porous fabric structures it has been observed that the cost of erection is dramatically reduced if on-site fabrication difficulties are minimised as the remote nature of many sites and the problem of erecting fabric in a wind both cut productive time.

Various means for attachment of the tensile cables to the fabric have hitherto been rather unsatisfactory in that spot attachments cause exaggerated loading of the plastics material adjacent to the spot attachment, and failure becomes more likely. Furthermore the shielding effectiveness is locally affected.

OBJECT

It is an object of the present invention to provide an improved textile product adapted for connection to external tensile cables capable of better withstanding tension, or one which will at least provide the public with a useful choice.

STATEMENT OF THE INVENTION

In a first major aspect the invention comprises a porous textile panel of knitted, woven, or extruded material suitable for use in shielding farm plants or animals from adverse weather, comprising a sheet having one or more edges adapted to receive and hold elongate reinforcing material, said reinforcing material being adapted for distributing tensions within yarns between discrete fixing points and the bulk of the panel.

In a related aspect the invention comprises a porous textile panel having selvedged edges and including within its edges elongated reinforcing material comprising an open loop of a hem cable made of a pliable multifilament wire braid inside a soft plastics sheath.

In another related aspect the invention comprises a porous textile panel further having discrete fixing points attached to support cables, said fixing points comprising a plurality of frangible plastic clips passed through the panel near its edges, said clips being capable of looping around both the hem cable and the support cables.

In a further aspect the invention comprises the frangible clips.

In yet another aspect the invention comprises a porous textile panel comprising a folded or bundled sheet having hem cable guiding means passed sequentially through a plurality of apertures in at least one edge; said cable guiding means being selected from (a) a plastics tube implanted using a spike or the like, or (b) a cord or rope implanted using a hollow spike or the like, so that at the time of installation a hem cable can be drawn through the panel edges using the hem cable guiding means.

In another major aspect the invention comprises a method of constructing a protective barrier using a porous textile panel, comprising the steps of (a) inserting an elongate reinforcing material within at least one edge of the panel, (b) erecting a framework to support tensed cables, (c) pro-stretching the cables, (d) attaching the porous textile panel to said tensed cables over the area to be protected by means of a plurality of frangible plastic clips passed through the panel near its edges, said clips being looped around both the elongate reinforcing material and the support cables.

In a related constructional aspect the invention comprises a method of constructing a protective barrier using a porous textile panel additionally comprising the steps of (a) using a textile panel including a pair of hem cables each running along one side and one end, (b) anchoring one adjacent end of each hem cable at a first corner to an anchor point, (c) running the hem cables around pulleys anchored at corners adjacent to the first corner, (d) terminating the hem cable at a cable tensioning site at the corner opposite the first corner, and (e) placing the hem cable under tension, thereby maintaining the panel in a spread-out state.

In a further aspect the invention comprises an installed and supported porous textile panel of knitted, woven, or extruded material capable of use in shielding farm plants or animals from adverse weather.

BRIEF DESCRIPTION OF THE DRAWINGS

The following is a description of a preferred form of the invention, given by way of example only, with reference to the accompanying diagrams.

FIG. 1: is an illustration of a process for folding a fabric on spikes.

FIG. 2: is an illustration of a hem cable of the present invention.

FIG. 3: is an illustration of an installed frangible clip of the present invention, in location.

FIG. 4: is an illustration of a method for supporting and tensioning a protective shield made of a porous fabric including a hem cable.

FIG. 5: is an illustration of portions of the fabric support system of FIG. 4.

PREFERRED EMBODIMENT

This invention relates in particular to various means to include at least one tensile member or hem cable along the length of a strip of woven or knitted fabric, with the objects of (a) providing greater tensile strength within the fabric panel, and (b) distributing sideways tensions arising from external cable attachment points more evenly within the substance of the textile.

Conventional manufacture of a woven or knitted textile includes the steps of arranging a number of parallel threads from supply reels to pass through a knitting or weaving station, knitting or weaving them together, and taking up the knitted or woven fabric onto a storage/transport drum. In general the knitting action is carried out within a vertical section of a knitting machine. Weaving is done in a horizontal plane. The edges of the strip of woven textile material are often folded over or selvedged—partly as a protection against fraying.

Prior art hem attachment devices have been discussed above.

EXAMPLE 1

In this example we prefer to use multi-strand steel cable with a polyvinyl chloride (PVC) plastics sheath as our installed hem cable. This is applied to the fabric at the installation site. One preferred cable is made up of 19 strands braided together, having a total diameter of ⅛ inch. Preferably these are "Extra high tensile" stainless steel cable as this material can provide additional shock-lead dissipation. Cables with more than 19 strands may be more preferable. FIG. 2 illustrates a sample of hem cable at 200, wherein 201 is the soft sheath and 202 is a bundle of wires.

The choice of hem cable is important in order to enable it to perform several functions, namely:

(1) it is soft and flexible enough to allow it to be fed through conventional hem-sewing fabrication equipment without risking damage to the equipment or the operators, (2) it is flexible enough to allow the completed panels to be folded or bundled up without risk of kinking the wire and thereby severely limiting its in-service ultimate strength, (3) it is strong and rigid enough to carry sufficient tension to adequately gather the fabric lead between clip attachment points, (4) it has a sufficiently soft exterior coating to facilitate the indentation of individual fibre yarns into its surface to provide some hindrance against sliding (5) it is flexible enough to absorb a measure of shock loading caused by gusty winds against the fabric, and (6) it is able to withstand corrosive environments for the life of the fabric (typically about 10 years).

The outer diameter of the sheath is ⅜ inch. The sheath provides environmental protection and, as it is relatively soft, it tends to hold the tensed fabric strands in place within indentations so that any tendency to gather is minimised.

In this example we take the cloth, generally a knitted net, as it issues from the knitting machine and thread a plastics pipe through each edge. The final product as shipped comprises perhaps 100 m (300 feet) of material bunched up in a zig-zag manner into a length of perhaps 8 m (20 feet), with each edge penetrated many times by a length of plastic hose or pipe typically of a soft plastic, of ⅜"ID. Each pipe is retained in place by the usual means, such as wrapping the bunched-together fabric with bale ties. On arrival at the site, and prior to installation, the plastic pipe is replaced by a wire cable capable of carrying a substantial tensile force. Optionally, the wire cable is threaded through the inside of the pipe while the material is still wrapped up, and its ends are secured to some shelter support device such as a pole before the fabric is cut free and stretched out along the length of the wire cable, and the soft plastic pipe is removed. An alternative threading process is to couple one end of the plastic pipe to the cable and pull the pipe out, drawing the cable through the material hems as it goes.

Once the material is laid out at its full length, we prefer to use our plastic clips shaped like elongated "D"s which may be placed over a further external tension-carrying cable joined to supporting structures, and clipped through the fabric on the inside of the hem cable so that both cables are encircled by the material of the clips. Our preferred clips, the subject of a copending patent application, are designed to have a reliable strength under static and dynamic loads, with the ultimate strength at the point of failure adjusted to be between 15% and 30% of the ultimate strength of the hem cable. The preferred material (Nylon 6) varies in strength with local humidity and temperature. FIG. 3 illustrates one of our preferred frangible clips 303 in place. In FIG. 3, 301 is an external support cable and 302 is a hem cable. The clip 303 comprises a U-shaped strip of plastic with two arms 306 and a connecting piece 307 which penetrates the substance of the material; emerging from one arm and locking in place through an aperture at the head of the other arm. These clips have a weakened point (a narrow section 308) along each arm so that they have a definite and controlled breaking point.

Thus the hem cables serve to concentrate the tensions applied at the clips along a reasonable length of the fabric, thereby minimising local stresses. As a result the material may have a longer service life or a less substantial material can be used instead of what was necessary under previous systems, thus saving in weight, cost, and resources.

Reverting to the textile manufacturing process, improved ways to place the plastic pipe in the hems of the material will now be described. It will be appreciated that these methods may be further automated.

One method is to mount a pair of vertically oriented spikes in the floor or on a low table, separated by about half the usual width of the material, for example 3 meters (10 feet). The spikes may be 2 meters (6 feet) in length. The cloth issuing from the knitting machine or from a temporary storage place is repeatedly manually folded into a zigzag and placed over the spikes so that they penetrate the hem of the material on each side at sites spaced by about 1" to 1 foot apart, depending on the fabric and the lead it is to take. Once the spike's length has been taken up by folded cloth, a length of tube may be placed over the end of the spike and the cloth slid off the spike and onto the tube. The spike is then moved forwards or the cloth is moved backwards to allow another "spikeful" of cloth to be gathered onto the spike and hence onto the tube. This process may be repeated several times before the usual total of 100 m of cloth folded into 8 m is reached.

A version of this method adapted for automation is to secure spikes horizontally, then fold the cloth and at the same time push it over the spikes. FIG. 1 illustrates at 100 the principles of one automatic feeder to fold and place a cloth onto a pair of spikes. Yarn is fed at 101 from supply reels into a knitting machine 102; the output of which passes round a roller 103 and between a pair of oscillating bars 104 adjacent to a pair of spikes 107 mounted together on a support 106. As the cloth emerges from he oscillating bars it is pushed over the spikes. A takeup claw (not shown) can aid in moving the cloth over the spikes.

Advantages of this process include that the shipped fabric may be compacted, whereas shipping it with the usual type of tension-capable cable already in place would inevitably result in poor packaging density because of the different properties of the cable and the cloth when compressed into a bale.

The usual package shipped to an end user would comprise prefabricated porous fabric panels complete with cable hem reinforcing and fittings to secure and tension the cable. Optional extras include the support cables, cable pre-tension means, eye bolts, and the like.

EXAMPLE 2

As a further development, we propose to pass the hem cable around the ends of the strip of fabric enclosing it. This concept of using a continuous cable to provide selvedge reinforcing for two or more adjacent edges of a fabric panel also provides, with the use of a pulley threaded onto the cable at two opposing corners of a panel, a means for tensioning the strip at one point. Two or more sections of cable around the perimeter of a fabric panel can be tensioned at the same time.

FIGS. 4 and 5 illustrate a method which makes use of this hem cable for rigging a panel of a porous cloth in any attitude; horizontal, vertical, or sloping, so that it can be stretched out. FIG. 4 shows at 400 a panel of a porous cloth which may for example be 30 to 100 feet in length and 5–60 feet across. It is supported by frangible clips 406 between a pair of cables 401, 402 which cables are placed under tension and is held in a defined place by anchor points shown as squares—such as 505, 409 and 410. The fabric 403 of the panel is provided with a hem cable which can be regarded as being in two sections 404 and 405, coming together at the anchor point 409 though they may in fact be a single cable. Section 404 passes through the top and the left side of the panel as drawn, and terminates at an anchor point 411; optionally through a tension spring. Section 405 passes down the fight side along the hem at the bottom of the illustration, terminating in anchor point 410. Each cable passes around a pulley; 407 or 409. FIG. 5 shows at 500, detail of pulley 407. This pulley is anchored at 505 (perhaps a swaged or crimped collar over the support cable 501 or alternatively tied to a pole or other rigid point) and the hem cable 504 emerges from the hem 502 of the cloth 503, passes around the pulley, and continues towards the other anchor point. The anchor points may be a support pole, but may be points along the support cables, either the main cable or a transverse cable. The cloth may be supplied with pulleys already threaded onto the hem cable.

The following examples relate to different kinds of cloth.

EXAMPLE 3

In this example, cable is inserted in the hemmed cloth at the time of fabrication. The cloth would normally be woven or sometimes knitted or extruded and would be in the range from the type known as 20% shade cloth to fully solid cloth.

EXAMPLE 4a

In this example, cable is inserted into a knitted net. This type of cloth varies from about 3% shade to about 25% shade.

EXAMPLE 4b

Cable is inserted into a denser knitted cloth (shade factor 30–90% shade) but knitted with purpose-provided eyelets—generally rectangular—along selvedges.

EXAMPLE 4c

A process in which a tube is inserted manually with the help of spikes and exchanged for cable (usually of the same type as for Example 3) at the site.

EXAMPLE 4d

A process in which a tube is inserted automatically, and exchanged for cable (usually of the same type as for Example 3) at the site.

Advantages of this construction of porous fabric for use in protective shields include:
  (a) that the fabric as shipped is either ready to use, or ready to quickly insert hem cables and then use,
  (b) that installation is simpler, and
  (c) that a well-placed, suitable hem cable provides a more stable, longer-life installation relatively resistant to environmental damage.

Finally, it will be appreciated that various alterations and modifications may be made to the foregoing without departing from the scope of this invention as set forth.

We claim:

1. A porous textile panel of knitted, woven, or extruded material suitable for use in shielding farm plants or animals from adverse weather, comprising a sheet having one or more selvedged edges which receive and hold elongate reinforcing material, said reinforcing material distributing tensions which arise within said panel at discrete spaced apart points at which said panel is attached to a support structure along a length of the panel and including within its edges elongated reinforcing material comprising a hem cable made of a pliable multifilament wire braid inside a soft plastic sheath.

2. A porous textile panel as claimed in claim 1, further having discrete spaced apart fixing points attached to tensioned support cables located outside the selvedge edge and forming part of the support structure, said fixing points comprising a plurality of frangible plastic clips passed through the panel near its edges, said clips being looped around both the hem cable and the support cables.

3. A porous textile panel for use in shielding farm plants or animals from adverse weather, comprising a sheet having a selvedged edge, a reinforcing cable disposed within said selvedged edge, a tensioned support cable outside said selvedged edge and extending parallel to said reinforcing cable, and a plurality of spaced apart clips passing through said panel adjacent said reinforcing cable and surrounding and interconnecting said reinforcing cable and said support cable.

4. A porous textile panel as claimed in claim 3, wherein said reinforcing cable is a pliable multifilament wire braid inside a soft plastic sheath.

* * * * *